(12) United States Patent
Cafarella

(10) Patent No.: US 7,346,313 B2
(45) Date of Patent: Mar. 18, 2008

(54) CALIBRATION OF I-Q BALANCE IN TRANSCEIVERS

(76) Inventor: John H. Cafarella, 65 Galloupes Point, Swampscott, MA (US) 01907

( * ) Notice: Subject to any disclaimer, the term of this patent is extended or adjusted under 35 U.S.C. 154(b) by 673 days.

(21) Appl. No.: 10/379,352

(22) Filed: Mar. 4, 2003

(65) Prior Publication Data
US 2003/0223480 A1 Dec. 4, 2003

(51) Int. Cl.
H04B 17/00 (2006.01)
(52) U.S. Cl. .............................. 455/67.11; 455/67.13; 455/69; 455/70; 375/219; 375/222; 375/259
(58) Field of Classification Search ............ 455/67.11, 455/67.13, 69, 70, 78, 83; 375/219, 222, 375/259, 377
See application file for complete search history.

(56) References Cited

U.S. PATENT DOCUMENTS

| | | |
|---|---|---|
| 5,559,516 A | 9/1996 | Didomizio et al. |
| 5,673,108 A | 9/1997 | Takeuchi |
| 5,705,949 A | 1/1998 | Alelyunas et al. |
| 5,732,111 A | 3/1998 | Walley |
| 5,847,619 A | 12/1998 | Kirisawa |
| 5,872,538 A | 2/1999 | Fowler |
| 5,930,286 A | 7/1999 | Walley |
| 5,933,106 A | 8/1999 | He et al. |
| 5,959,294 A | 9/1999 | Green et al. |
| 5,969,667 A | 10/1999 | Farmer et al. |
| 6,008,900 A | 12/1999 | Green et al. |
| 6,058,291 A | 5/2000 | Ketcham |
| 6,072,427 A | 6/2000 | McEwan |
| 6,075,820 A | 6/2000 | Comino et al. |
| 6,134,281 A | 10/2000 | Green et al. |
| 6,294,952 B1 | 9/2001 | Kato |
| 6,298,096 B1 | 10/2001 | Burgin |
| 6,307,902 B1 | 10/2001 | Walley |
| 6,340,883 B1 | 1/2002 | Nara et al. |
| 6,717,981 B1 * | 4/2004 | Mohindra .................... 375/219 |
| 6,842,489 B2 * | 1/2005 | Masenten .................... 375/261 |
| 2002/0042255 A1 * | 4/2002 | Prentice .................... 455/232.1 |
| 2003/0165203 A1 * | 9/2003 | Mohindra .................... 375/324 |
| 2003/0206603 A1 * | 11/2003 | Husted ........................ 375/324 |

* cited by examiner

Primary Examiner—Matthew Anderson
Assistant Examiner—Tuan Pham
(74) Attorney, Agent, or Firm—McDermott Will & Emery LLP

(57) ABSTRACT

Transceivers using direct conversion between baseband and RF have become popular for low-cost designs. Bandwidth-efficient modulations employ information on both phases of the carrier, and for high-order signaling alphabets, it becomes problematic to realize Direct-Conversion transceivers for which adequate gain balance between I and Q channels throughout the transmit and receive chains. For heterodyne transceivers I-Q balance is often less of an issue, by contrast, because most of the required gain operates at an Intermediate Frequency. In both cases, the trend toward lower supply voltages further exacerbates this problem because of the poorer control of analog parameters at low voltage. The present invention addresses this difficulty via a calibration method and system in which a calibration signal is generated in the transmit stage and injected into the receive stage so that any mismatches in gain can be observed and corrected.

74 Claims, 11 Drawing Sheets

CALIBRATION OF I-Q BALANCE IN TRANSCEIVERS

FIELD OF THE INVENTION

This invention relates generally to transceivers for digital communications whose modulations require gain balance between I and Q channels, and more particularly for low-cost applications of such transceivers, such as wireless LANs.

BACKGROUND OF THE INVENTION

Wireless communication systems can employ different types of transceivers. Traditional heterodyne transceivers, for example, employ most of the required gain at an Intermediate-Frequency (IF), between the Radio Frequency (RF) and baseband. While very attractive for high-performance applications, heterodyne transceivers require IF components, which cannot be integrated on-chip, thereby increasing the cost. Direct-conversion transceivers, as the name implies, convert directly between RF and baseband, and hence have become popular for Integrated Circuits (ICs) to be used in low-cost equipment.

It is well known in the art that the bandwidth of wireless transmissions can be increased by transmitting data as complex components, e.g., general electronic signals can be represented as complex quantities mathematically, and that this can be viewed as using both phases of a carrier signal. Thus, it is generally accepted that a signal can have a real component synonymous with the real signal impressed upon the cosine carrier and identical to the in-phase (I) signal, and an imaginary component synonymous with the real signal impressed upon the sine carrier and identical to the quadrature (Q) signal. When not on a carrier, which is referred to as baseband, these I and Q signals exists as real signals in two channels commonly called I and Q, respectively. Because direct-conversion transceivers must realize most of the gain required for transmission and for reception at baseband, it becomes problematic to realize direct-conversion transceivers with adequate gain balance between the I and Q channels for some applications. Even heterodyne-conversion transceivers can be difficult in such situations; their baseband elements may not achieve adequate I-Q gain balance, especially at low supply voltages.

Bandwidth-efficient digital modulations, e.g., M-QAM and M-PSK, employ information on both in-phase and quadrature components of the carrier. As the number of constellation points M becomes large, the constellation points become close together; distortions of the complex amplitude eventually become the limiting factor in reducing symbol errors. The trend toward lower supply voltages further exacerbates this problem. While the performance of digital ICs eventually suffer at supply voltages below approximately 1V, poorer control of circuit parameters makes the performance of analog ICs difficult with power supplies below about 2.5V. Thus, calibration in order to balance the gains provided in the I and Q channels for both transmit and receive becomes critical for ICs designed to operate on low-voltage supplies.

While injection of DC calibration signals to calibrate the baseband transmit and receive gains is possible, the inclusion of this function presents a layout difficulty for critical circuitry. Furthermore, such signals would not provide calibration of the effective conversion gains of the RF up-conversion and down-conversion mixer elements.

The present invention is designed to improve the quality of transceivers operating with low voltage power supplies so as to support higher signaling alphabets. The calibration technique must be comprehensive in the sense of calibrating the transmit and receive chains independently and also including all relevant gains in the calibration process. Finally, the calibration process should place less design stress on the circuitry than would be required using commonly known alternate calibration approaches such as the ones described below.

SUMMARY OF THE INVENTION

A system and method is described for calibrating a transceiver system for transmitting and receiving data using both I and Q channels and including a transmit chain and a receive chain. A calibration RF signal, generated in response to and as a function of a signal generated through the transmit chain, is injected into the receive chain of the transceiver in order to independently calibrate the I-Q gain balance of the both transmit and receive chains in their entirety.

In accordance with one embodiment, the calibration RF signal originates at baseband in the transmit channel, and is observed at baseband in the receive channel.

The transceiver can be a direct-conversion transceiver, or a heterodyne-conversion transceiver.

The channel gain can be adjusted so as to vary the differential I-Q gain in the transmit and receive chains independently in response to the calibration RF signal being injected into the receiver chain. The channel gain is adjusted so as to vary the differential I-Q gain in the imbalanced chain in response to the calibration RF signal being injected into the receiver chain.

In one embodiment a system and method calibrates a transceiver system for transmitting and receiving data using both I and Q channels, wherein the transceiver comprises (a) a transmit chain including a signal generator for generating a baseband transmit signal; baseband I-Q amplification subsystem for providing baseband amplification of the baseband transmit signal; a direct-conversion subsystem for converting the baseband transmit signal to an RF transmit signal, and including an RF transmit signal port; and (b) a receive chain including an RF receive port for receiving an RF receive signal; direct-conversion subsystem for converting the RF receive signal to a baseband receive signal; baseband I-Q amplification subsystem for providing amplification of the baseband receive signal; a processor for processing of the baseband receive signal as required for the normal function of the transceiver. The system and method includes using a calibration RF signal, generated as a baseband transmit signal; injecting the calibration RF signal from the RF transmit signal port to the RF receive signal port; processing the baseband receive calibration RF signal to form an observable indicator of I-Q imbalance; and varying the differential I-Q gain in the transmit and receive chains independently.

In one embodiment the injection of the calibration RF signal is prevented from permanently imparting an unfavorable net phase shift from baseband transmit to baseband receive. In one embodiment phase-calibration cycling is used to prevent the injection of the calibration RF signal from permanently imparting an unfavorable net phase shift from baseband transmit to baseband receive, while in another embodiment slowly time-varying phase modulation is used for that purpose.

In one embodiment the calibration RF signal includes generating a sequence of pulses taking on purely real or imaginary values at any instant, a sampled phasor, or a discrete phasor, the latter, for example, comprising $j^n$ or $j^{-n}$.

In one embodiment, the calibration RF signal includes a calibration cycle, and further includes using the calibration cycle so as to determine the transmitter I-Q gain settings so as to minimize the observable indicator while holding the receive I-Q gain settings constant, and determining the receiver I-Q gain settings so as to minimize the observable indicator while holding the transmit I-Q gain settings constant.

In one embodiment the calibration RF signal includes successive calibration cycles, and further including using the successive calibration cycles to refine or maintain I-Q balance.

In one embodiment, the system and method includes varying the differential I-Q gain in the imbalanced chain so as to adjust the gain.

Generating the calibration RF signal includes generating a sequence of pulses taking on purely real or imaginary values at any instant. The calibration RF signal includes a sampled phasor, or a discrete phasor. The discrete phasor can comprise $j^n$ or $j^{-n}$. Successive calibration cycles can be used to refine or maintain I-Q balance.

In one embodiment a system and method is used to calibrate a transceiver system of the type comprising (a) a transmit chain including a signal generator for generating a baseband transmit signal; a baseband I-Q amplification subsystem for providing baseband amplification of the baseband transmit signal; at least one stage of frequency conversion of the baseband transmit signal to an intermediate frequency; a conversion subsystem for converting the baseband transmit signal at the intermediate frequency to an RF transmit signal, and an RF transmit signal port; and (b) a receive chain including an RF receiving port for receiving an RF receive signal; at least one stage of frequency conversion of the receive signal to an intermediate frequency; a conversion subsystem for converting the RF receive signal to a baseband receive signal; baseband I-Q amplification subsystem for providing amplification of the baseband receive signal; a processor for processing the baseband receive signal as required for the normal function of the transceiver. The calibration system and method comprises generating a calibration RF signal as a baseband transmit signal; injecting the calibration RF signal from the RF transmit signal port to the RF receive signal port; processing the baseband receive calibration RF signal to form an observable indicator of I-Q imbalance; and varying the differential I-Q gain in the transmit and receive chains independently so as to adjust the differential I-Q gain so as to minimize any difference.

In one embodiment the calibration RF signal is performed in such as way so as to prevent the calibration RF signal from permanently imparting an unfavorable net phase shift from baseband transmit to baseband receive. This is accomplished, for example, by a phase-calibration cycling, or a slowly time-varying phase modulation.

The calibration RF signal includes, in various embodiments, a sequence of pulses taking on purely real or imaginary values at any instant, a sampled phasor, or a discrete phasor. Regarding the latter, a discrete phasor can comprise $j^n$ or $j^{-n}$.

In one embodiment the calibration RF signal includes a calibration cycle, wherein the method further includes using the calibration cycle to determine the transmitter I-Q gain settings which minimize the observable indicator while holding the receive I-Q gain settings constant, and determining the receiver I-Q gain settings which minimizes the observable indicator while holding the transmit I-Q gain settings constant.

In another embodiment the calibration RF signal includes successive calibration cycles, and the system and method further include using successive calibration cycles to refine or maintain I-Q balance.

In one embodiment, at least one stage of frequency conversion includes amplification means for amplifying the transmit signal at the intermediate frequency.

In one embodiment, a system and method is used to calibrate a transceiver system of the type comprising: (a) a transmit chain including: a signal generator for generating a baseband transmit signal; a baseband I-Q amplification subsystem for providing baseband amplification of the baseband transmit signal; at least one stage of frequency conversion of the baseband transmit signal to an intermediate frequency; a conversion subsystem for converting the baseband transmit signal at the intermediate frequency to an RF transmit signal, and an RF transmit signal port; and (b) a receive chain including an RF receiving port for receiving an RF receive signal; at least one stage of frequency conversion of the receive signal to an intermediate frequency; a conversion subsystem for converting the RF receive signal to a baseband receive signal; baseband I-Q amplification subsystem for providing amplification of the baseband receive signal; and a processor for processing of the baseband receive signal as required for the normal function of the transceiver. The system and method comprise: generating a calibration RF signal as a baseband transmit signal; injecting the calibration RF signal from the RF transmit signal port to the RF receive signal port; processing the baseband receive calibration RF signal to form an observable indicator of I-Q imbalance; and varying the differential I-Q gain in the imbalanced chain so as to balance the I-Q gain.

The calibration RF signal includes, in various embodiments, a sequence of pulses taking on purely real or imaginary values at any instant, a sampled phasor, or a discrete phasor. The discrete phasor can comprise $j^n$ or $j^{-n}$.

The system or method can use successive calibration cycles to refine or maintain I-Q balance.

BRIEF DESCRIPTION OF THE DRAWINGS

In the drawings, similar parts are shown with the same numerals for ease of exposition only.

FIG. 1a depicts the transmit chain. FIG. 1b depicts the receive chain.

FIG. 2a depicts the transmit chain. FIG. 2b depicts the receive chain.

FIG. 3a depicts the transmit chain. FIG. 3b depicts the receive chain.

FIG. 6a shows a system with I-Q gain balance, such that a phasor experiences the same amplification independent of its instantaneous phase, while FIG. 6b shows a system with gain imbalance between the I and Q channels.

FIG. 7a shows the overlay of transmit and receive gain ellipses in the degenerate case of 90° net phase rotation, while

DETAILED DESCRIPTION OF THE DRAWINGS

Figure 1A:
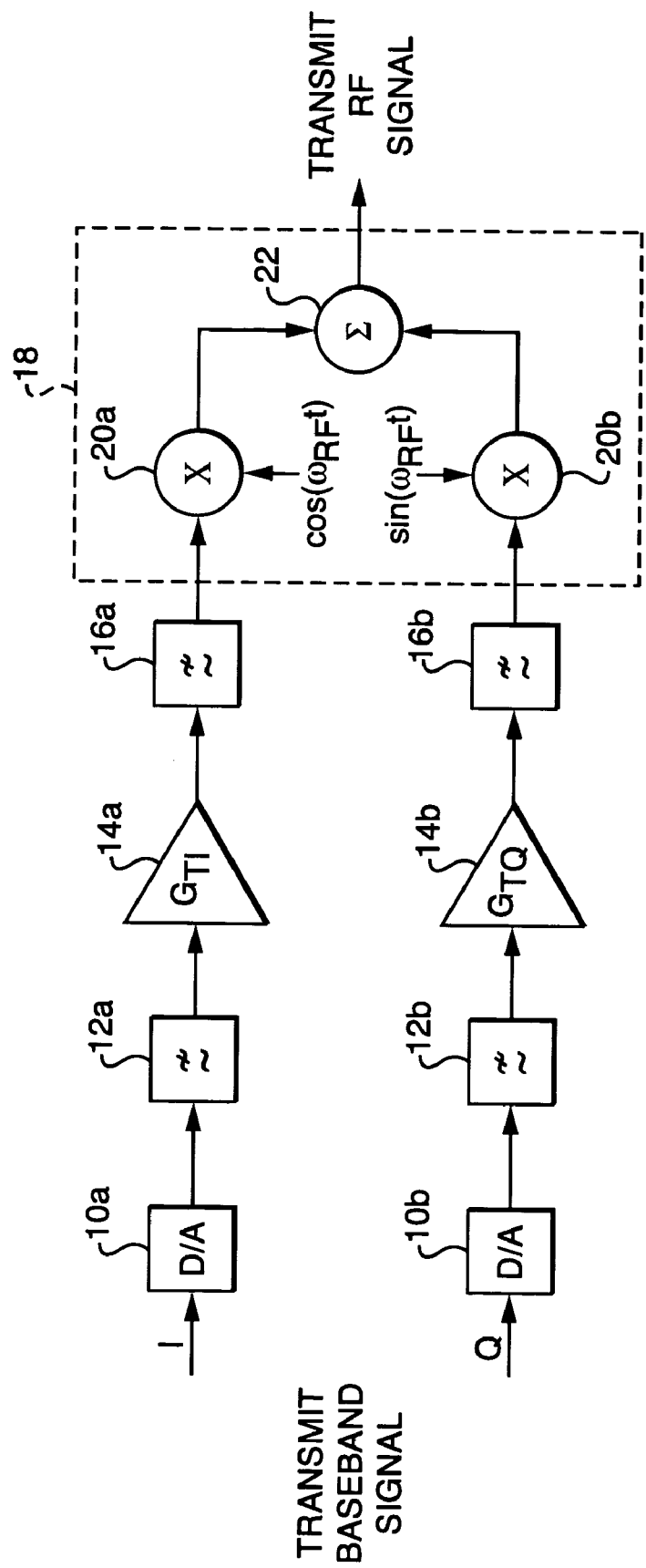
FIGS. 1a and 1b show a typical prior art direct-conversion transceiver block diagram.

The present invention is directed to a system for and method of injecting the transmit signal into the receive chain of the transceiver in order to support calibration independently of the I-Q gain balance of the both transmit and receive chains in their entirety, as required for proper operation among multiple users. This provides comprehensive I-Q gain balance, and in addition can be effected with non-critical circuit layout for the injection signal path. Furthermore, the calibration signals can originate at baseband in the transmit channel, and be observed at baseband in the receive channel. Consequently, there is minimal impact on the circuit layout to implement this calibration technique. While motivated primarily to enable realization of direct-conversion transceivers, this calibration method can be applied to heterodyne-conversion or alternative transceiver structures which implement less of the required gain at baseband.

More specifically, in order to attain high accuracy in the I-Q gain balance, a calibration signal is applied to the baseband input of the transmit chain. This signal is amplified and converted to a signal at the transmit RF port as would be any transmit signal during normal operation. Thus, this transmit RF signal includes all gains relevant to normal operation in the transmit chain.

A signal injection path is made available from the transmit RF output to the receive RF input of the transceiver. This injection path would be substantially suppressed in normal transceiver operation so as not to degrade receiver noise figure. The amplitude and phase accuracy for the injection path are generally non-critical, and the overall calibration process should be designed to not require excessive design stress on the injection path.

This receiver RF signal is amplified and converted to a signal at the receive baseband port as would be any receive signal during normal operation. Thus, this receive baseband signal includes all gains relevant to normal operation in the receive chain.

The calibration signal must be designed to be sensitive to I-Q gain imbalance. Furthermore, reasonably simple processing should be capable of producing an observable indicator of that imbalance. The calibration signal and subsequent processing must be such that the observable indicator of gain imbalance can only be minimized when both the transmit and receive gain imbalances have been individually minimized. That is, it should not be possible for a transmit-chain I-Q imbalance to be masked by any possible receive-chain I-Q gain imbalance.

The overall calibration process preferably proceeds by minimizing the imbalance observable with respect to gain adjustments in the transmit chain while holding the gains in the receive chain fixed, then minimizing the imbalance observable with respect to gain adjustments in the receive chain while holding the gains in the transmit chain fixed. Of course, whether the transmit or receive chain is adjusted first is immaterial. Furthermore, the process could alternate several times if required, for example, after initial application of power to the transceiver. In addition, after stable operation is achieved some form of prediction or adaptation algorithm could be used to minimize the frequency of calibration cycles required.

In some applications the need for recurrent calibration cycles might be objectionable. However, commonly a transceiver operates in half-duplex, and often with substantial structure in the pattern of transmissions and receptions. For example, there is usually a guard time interval, for example the inter-frame space in wireless LANs, during which a transceiver just having finished a transmission could perform a calibration cycle with no impact on system operation.

Referring specifically to the drawing Figures:

FIG. 1 shows a typical direct-conversion transceiver block diagram. FIG. 1a depicts the transmit chain. The baseband I and Q digital signals are converted by digital-to-analog (A/D) converters 10a and 10b, respectively, to analog signals, and passed through low-pass anti-aliasing filters 12a and 12b to form the analog version of the baseband transmit waveform. The resulting signals are amplified by the in-phase and quadrature transmit gains $G_{TI}$ and $G_{TQ}$ amplifiers 14a and 14b, low-pass filtered again by low pass filters 16a and 16b to limit the noise bandwidth, then converted to the complex RF signal in a complex modulator 18, as shown here using cosine and sine mixers 20a and 20b and summation at 22.

Figure 1B:
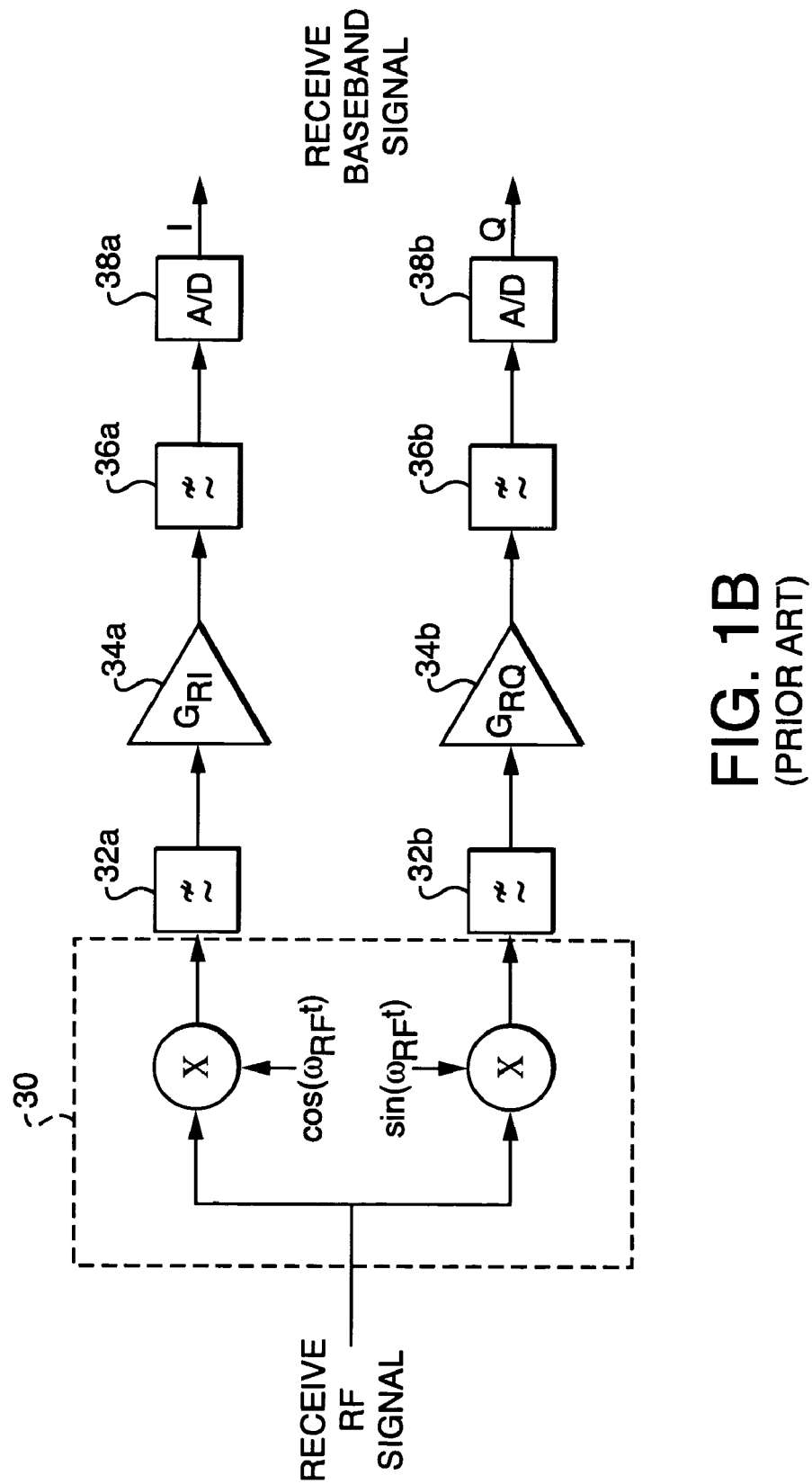

FIG. 1b depicts the receive chain. The RF signal is converted using demodulator 30 to baseband by mixing with cosine and sine signals at the RF frequency, and the I and Q components subsequently passed through low-pass filters 32a and 32b to suppress undesired frequencies. The resulting signals are amplified by the in-phase and quadrature receive gains $G_{RI}$ and $G_{RQ}$ of amplifiers 34a and 34b then passed through low-pass filters 36a and 36b which limit the noise bandwidth before sampling in the analog-to-digital (A/D) converters 38a and 38b.

It is well known in the art that a variety of such direct modulator and demodulator design implementations can be used, including conventional designs as shown in FIG. 1 as well as those which utilize sub-harmonic mixers. For example, a popular approach is to utilize a mixer driven by a local oscillator signal at half the RF carrier frequency to minimize the effects of local oscillator signal coupling to various circuit elements. The calibration technique described in this patent is applicable to any form of conversion between RF and baseband, and not limited to the conventional approach used as examples in the figures.

Figure 2A:
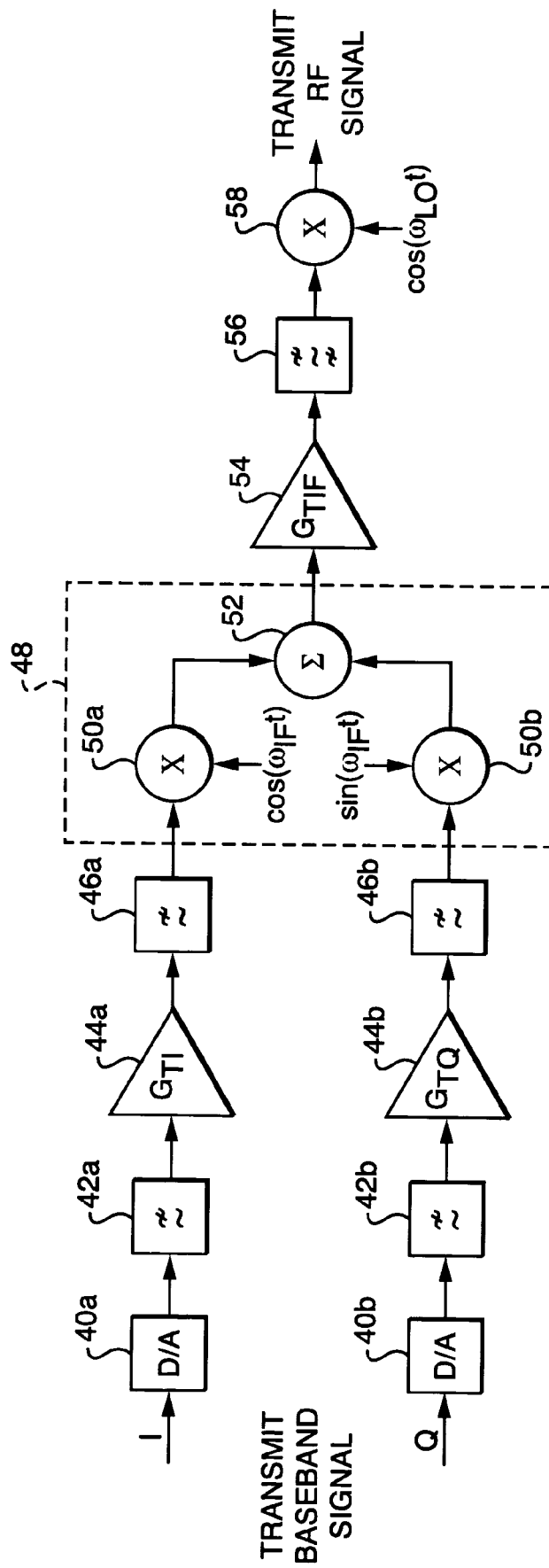
FIGS. 2a and 2b show a typical prior art heterodyne-conversion transceiver block diagram.

FIG. 2 shows a typical heterodyne-conversion transceiver block diagram. FIG. 2a depicts the transmit chain. The baseband I and Q signals are converted from digital to analog using D/A converters 40a and 40b, and passed through low-pass anti-aliasing filters 42a and 42b to form the analog version of the baseband transmit waveform. The resulting signals are amplified by the in-phase and quadrature transmit gains $G_{TI}$ and $G_{TQ}$ of amplifiers 44a and 44b, low-pass filtered again by low pass filters 46a and 46b to limit the noise bandwidth, then converted to the complex IF signal in a complex modulator 48, as shown here using cosine and sine mixers 50*a* and 50*b* and summation 52. The IF signal is amplified by the transmit IF gain $G_{TIF}$ of amplifier 54, filtered in the transmit IF filter 56, then mixed with the local oscillator 58 to translate to an RF signal.

Figure 2B:
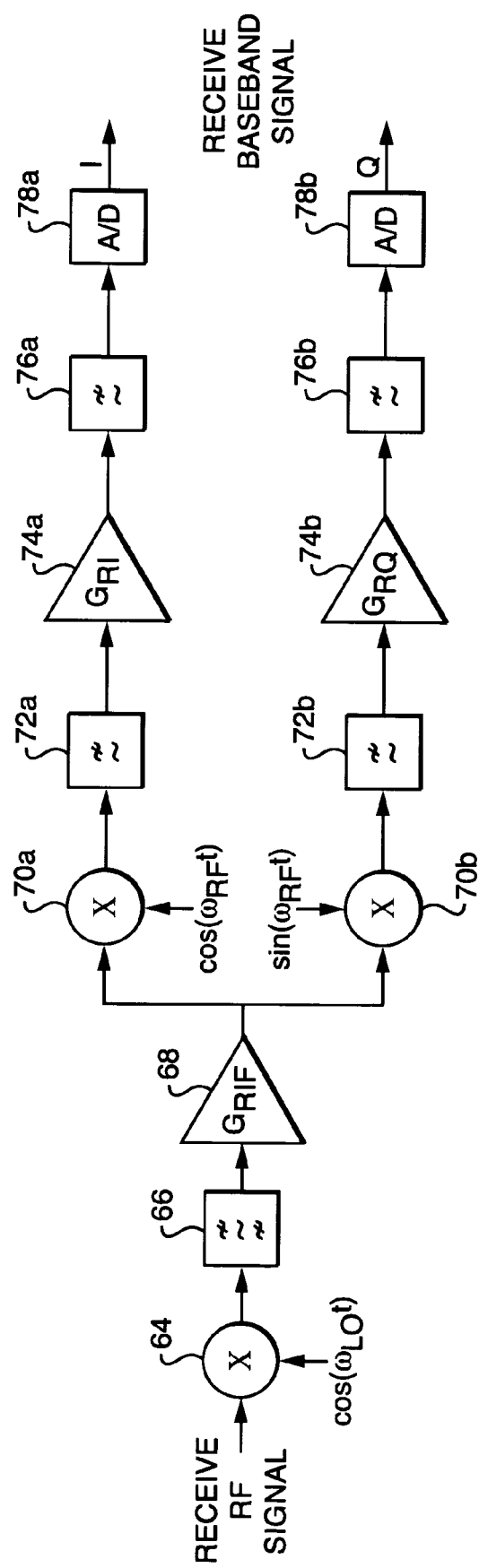

FIG. 2*b* depicts the receive chain. The RF signal is converted to an IF signal by mixing with the local oscillator 64, passed through the IF band pass filter 66, and amplified by the receive IF gain $G_{RIF}$ amplifier 68. The receive IF signal is converted to baseband by mixing with cosine and sine signals at the IF frequency using mixers 70*a* and 70*b* of the I and Q channels, and passed through low-pass filters 72*a* and 72*b* to suppress undesired frequencies. The resulting signals are amplified by the in-phase and quadrature receive gains $G_{RI}$ and $G_{RQ}$ of amplifiers 74*a* and 74*b*, then passed through low-pass filters 76*a* and 76*b* which limit the noise bandwidth before sampling in the analog-to-digital converters 78*a* and 78*b*. The transmit and receive IF gains $G_{TIF}$ and $G_{RIF}$ of amplifiers 68, 70*a* and 70*b* reduce the amount of gain required at baseband in the heterodyne-conversion transceiver, reducing the stress on baseband I-Q gain balance. However, the method of this patent can be used for heterodyne-conversion transceivers if a high degree of baseband I-Q gain balance is needed.

Figure 3A:
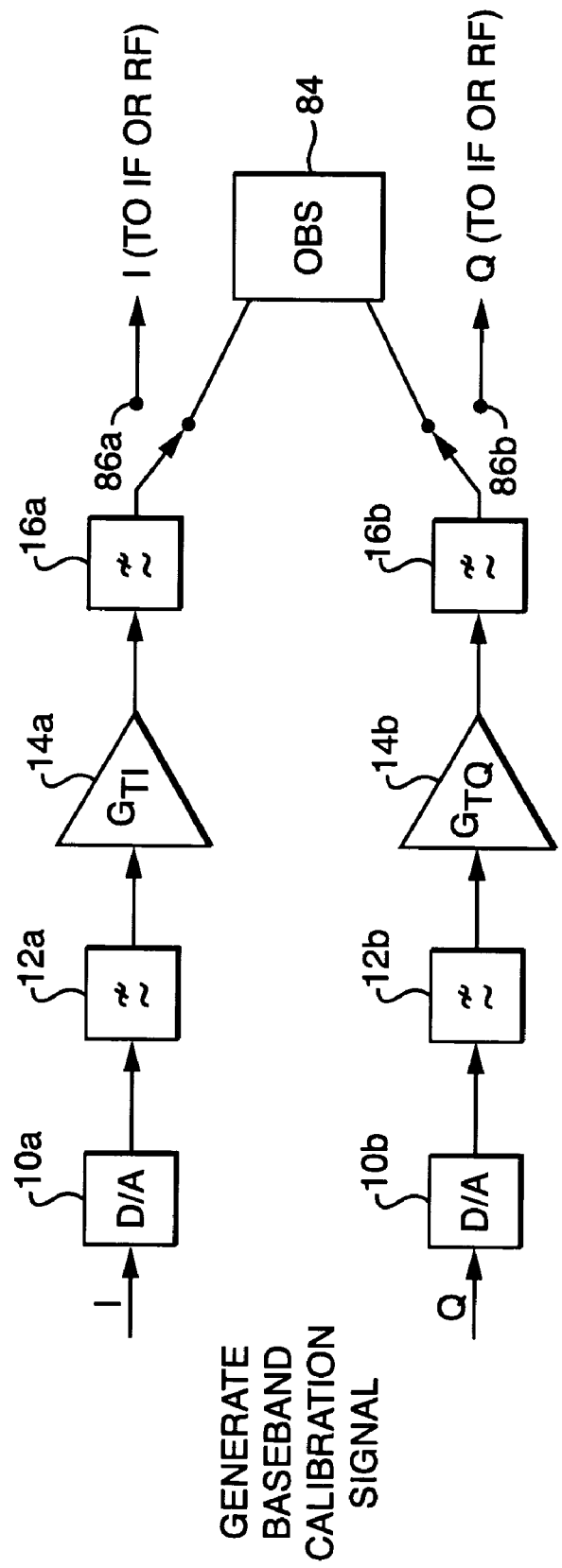
FIGS. 3a and 3b show a conventional prior art approach to calibration of the baseband gains in the transmit and receive chains which could be used for the baseband section of either direct-conversion or heterodyne-conversion transceivers.
Figure 3B:
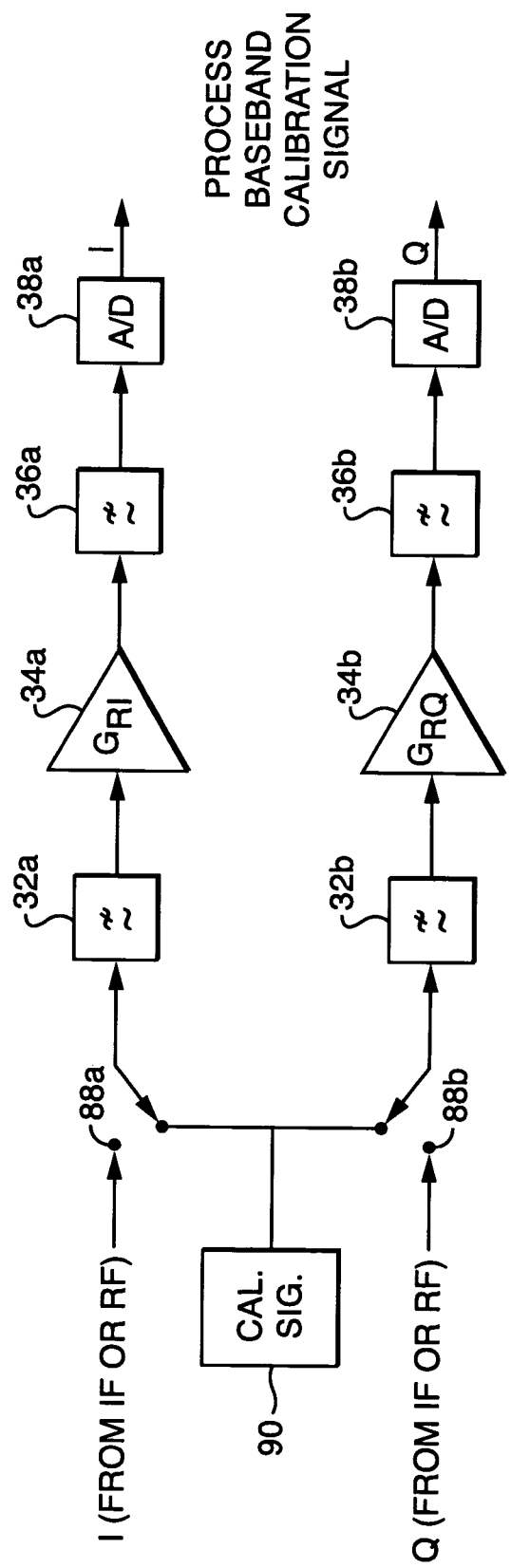

Typical transceiver designs require less gain in the transmit chain than used in the receive chain. Nevertheless, when very high accuracy is required to demodulate a particular signaling constellation it becomes necessary to calibrate both the transmit and receive chains. FIGS. 3*a* and 3*b* show a conventional prior art approach to calibration of the baseband gains in the transmit and receive chains of a transceiver, the approach being one which can be used for the baseband section of either direct-conversion or heterodyne-conversion transceivers.

FIG. 3*a* depicts the injection of a calibration signal into the normal I and Q inputs of the baseband transmit chain of the type shown in FIG. 1*a*. Circuitry 84 for forming an observation of the I and Q signals after baseband amplification must be included. The switches 86*a* and 86*b* shown for diverting the signals to the observation circuitry may not be necessary, depending upon circuit details. In any case, the paths to the comparison inputs of the observation circuitry, as well as the response of the observation circuitry to the two inputs, must match to ensure that the observation circuitry can adequately indicate a lack of I-Q gain imbalance in the baseband transmit chain.

FIG. 3*b* depicts the injection of a calibration signal into the I and Q inputs of the baseband receive chain of the type shown in FIG. 1*b*. The switches 88*a* and 88*b* shown for inserting the calibration signals may not be necessary, depending upon circuit details, but some means must be used to ensure that the calibration signal does not degrade reception during normal operation, and that received signals do not contaminate the calibration signal during the calibration process. The normal I-Q outputs of the receive chain can be monitored for forming an observation of the I and Q signals after baseband amplification. The paths from the calibration signal source 90 to the gain-chain inputs must match to ensure that the same calibration signal is delivered to both I and Q receive gain chains.

The extra circuitry required in FIGS. 3*a* and 3*b* is not extensive, but this circuitry must be included in portions of the overall design in places which are typically sensitive to layout constraints. Furthermore, the individual calibration of baseband gains in the transmit and receive chains does not include the conversion gains of the up-conversion and down-conversion mixing elements. Since these conversion gains may not match in the I and Q channels, a comprehensive calibration technique is needed. The present invention overcomes all of these difficulties. This method applies to a direct-conversion transceiver, but could be applied to calibrate I-Q gain balance in the baseband portion of a conventional heterodyne transceiver as well, or any other transceiver requiring I and Q channel gain balance. In addition, even if the transmit I-Q gain balance is achievable without calibration, the method of this invention can be used to calibrate the I-Q gain balance in the receive chain alone.

Figure 4:
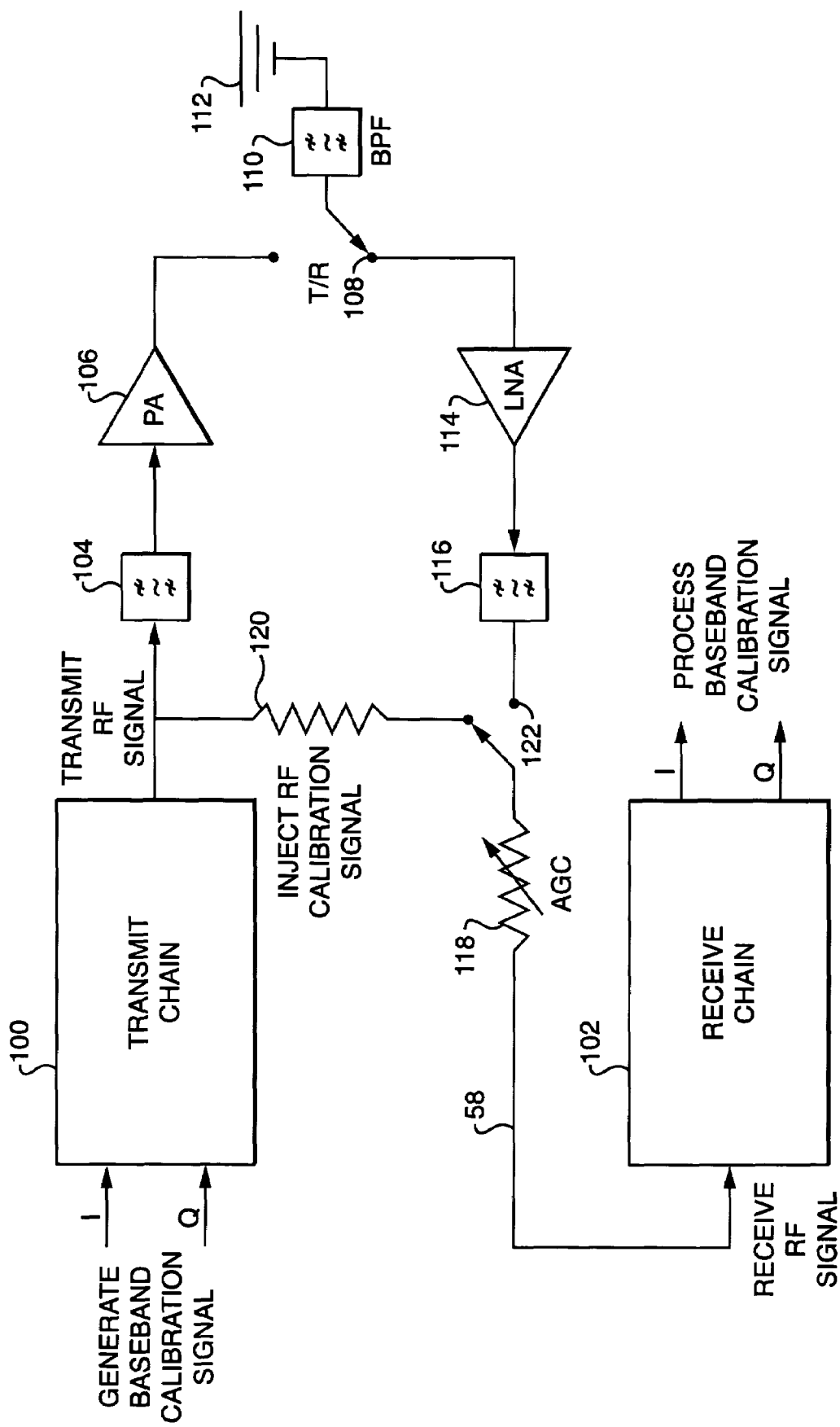
FIG. 4 shows one preferred embodiment of a typical transceiver incorporating the present invention and comprising transmit and receive chains plus a transmit power amplifier, receive low-noise amplifier, transmit/receive switch, band-pass filter, an antenna and an automatic gain control.

FIG. 4 shows a typical transceiver comprising the transmit and receive chains of FIG. 1 or FIG. 2, for example, and numbered 100 and 102 respectively. The calibration circuitry preferably includes a bandpass filter 104, transmit power amplifier (PA) 106, a transmit/receive (T/R) switch 108, a band-pass filter 110, an antenna 112, a receive low-noise amplifier (LNA) 114, a bandpass filter 116 and an automatic gain control (AGC) 118. These are all well-known elements of transceiver RF design. Operation of the AGC at RF is not essential, but it is a preferred approach because it enables fixed baseband amplification, which is more amenable to calibration. The RF signal from the transmit chain is provided a path to the RF receive chain, shown for example through an attenuator 120. This injection can be effected in many ways. It could be a dedicated signal path which is disabled in normal transceiver operation but activated for a calibration cycle. It could also be a controllable leakage path within the other RF circuitry. In any event, the amplitude and phase of the transmission path for the injected signal are not critical because the signal, being on the RF carrier at this point, is not subject to I-Q gain imbalance. Switch 122 is preferably a simple single throw, double pole switch used to switch between the calibration mode (as shown) to an operation mode (the switch being thrown in opposite position).

The calibration concept shown in FIG. 4 employs the normal baseband transmit input for introducing the calibration signal, and the normal baseband receive output for forming the observable indicative of I-Q gain imbalance. The only additional circuitry required for calibration is that to provide injection of the calibration signal from RF transmit output to RF receive input. This injection path is not critical in its transfer characteristics, nor is it located in critical layout areas for normal operation. Furthermore, this approach includes in the overall path of the calibration signal all paths used during normal operation, and therefore all possible sources of I-Q gain imbalance in the transmit and receive chains.

A variety of calibration signals could be found useful. These should be easy to generate and process, and the effect of I-Q gain imbalance must be directly related to an observable feature. One example is a sequence of pulses, in any order, for which a pulse is either purely real or purely imaginary at the transmit baseband input.

Figure 5:
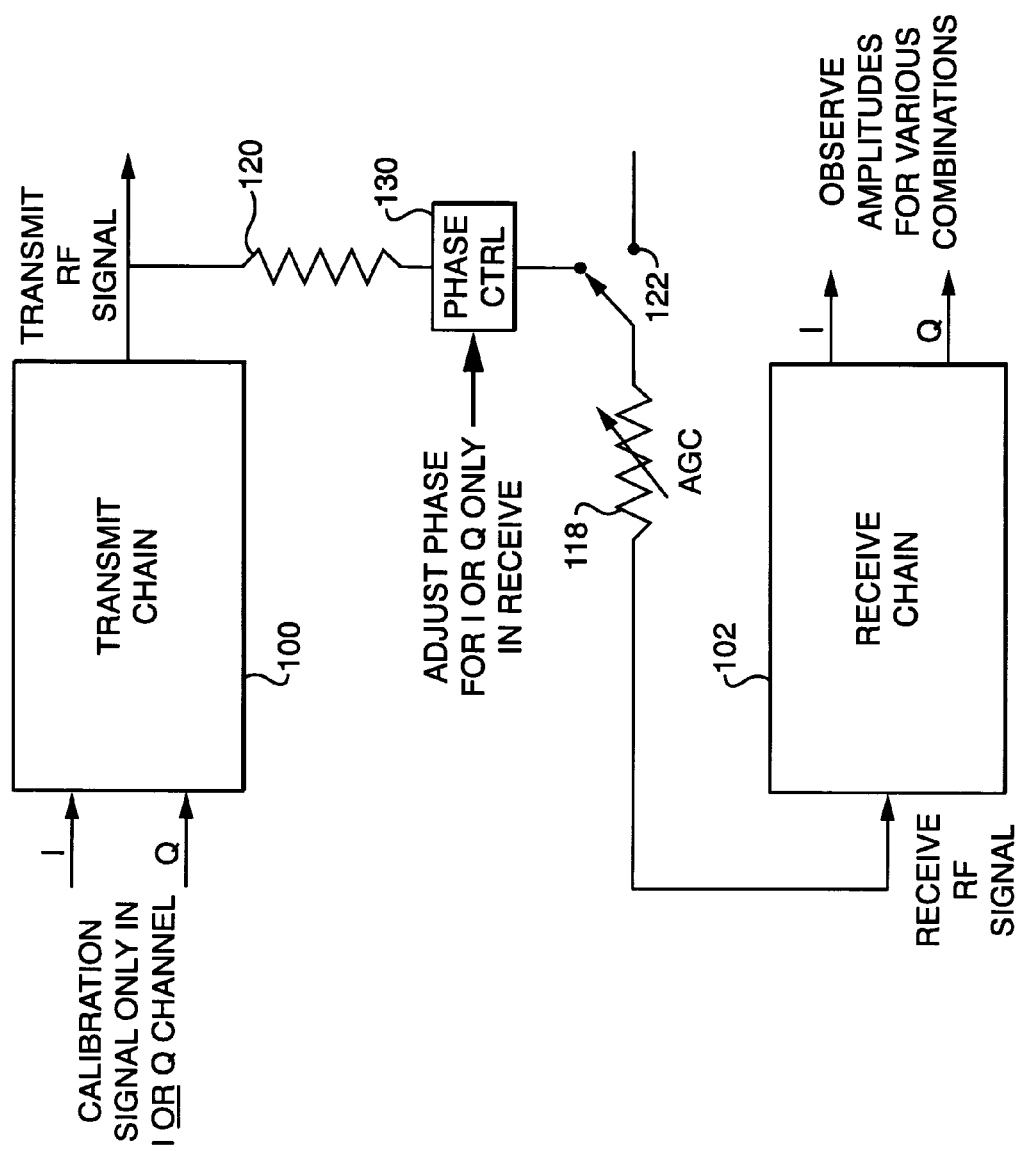
FIG. 5 shows a block diagram of one preferred embodiment of an approach utilizing purely real or imaginary calibration pulses, and forcing the observation to also be purely real or imaginary using a phase shift.

FIG. 5 shows a block diagram describing this approach. This corresponds to applying a non-zero value to the I or Q input of the transmit chain 100 while making the alternate, Q or I input, respectively, zero. In this case the signal path providing injection of the calibration signal from transmit RF to receive RF must include a phase control 130 for shifting RF carrier phase so that the signal can be made to substantially appear at only the I or Q output of the receive baseband. The transmit I and Q gains are $G_{TI}$ and $G_{TQ}$, respectively, while the receive I and Q gains are $G_{RI}$ and $G_{RQ}$, respectively. By suitable observation of the receive baseband output signal for the various transmit baseband input signals, while also adjusting the phase of the injected signal from transmit RF to receive RF, it is possible to determine the four combinations $G_{TI}G_{RI}$, $G_{TI}G_{RQ}$, $G_{TQ}G_{RI}$ and $G_{TQ}G_{RQ}$. Therefore, it is possible of determine the transmit-chain I-Q gain imbalance by computing $|G_{TI}G_{RI}|-|G_{TI}G_{RQ}|$ and/or $|G_{TQ}G_{RI}|-|G_{TQ}G_{RQ}|$ without knowing either $G_{RI}$ or $G_{RQ}$. Similar is true for determining the receive-chain I-Q imbalance.

While the above process would provide adequate calibration for many applications, the phase control in the calibration-signal injection path is somewhat difficult. It requires a total range of phase shift in excess of 90°, and precision in phase control consistent with the ultimate calibration accuracy required. It furthermore requires extra time during the calibration process to make the multiple phase adjustments accurately.

A preferred embodiment for the calibration signal is a baseband phasor at non-zero frequency. It is well known in the radar art that I-Q gain imbalance in a radar receiver causes "ghosts" in a Doppler response. That is, for a target signal having a temporal modulation $e^{j\omega t}$, where $\omega$ is the Doppler frequency imparted by the target motion, I-Q gain imbalance in the radar receiver causes a second signal $\gamma e^{-j\omega t}$, where $\gamma \equiv (G_{RI}-G_{RQ})/(G_{RI}+G_{RQ})$ is the gain imbalance parameter. Thus, a target moving away from the radar has a ghost moving toward the radar. In the present invention, a phasor calibration signal applied as the baseband transmit input signal will produce a ghost phasor rotating in the opposite direction if either the transmit or receive chain have gain imbalance between I and Q. This ghost phasor constitutes an observable for the calibration process.

Figure 6A:
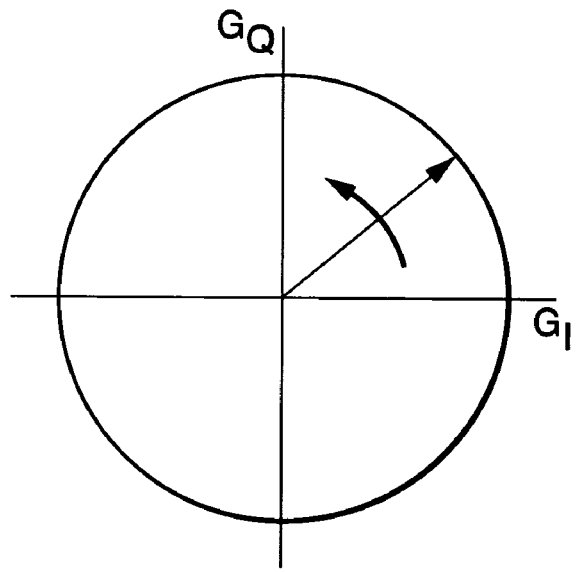
FIGS. 6a and 6b present graphical representations of phasor ghost generation due to gain imbalance.
Figure 6B:
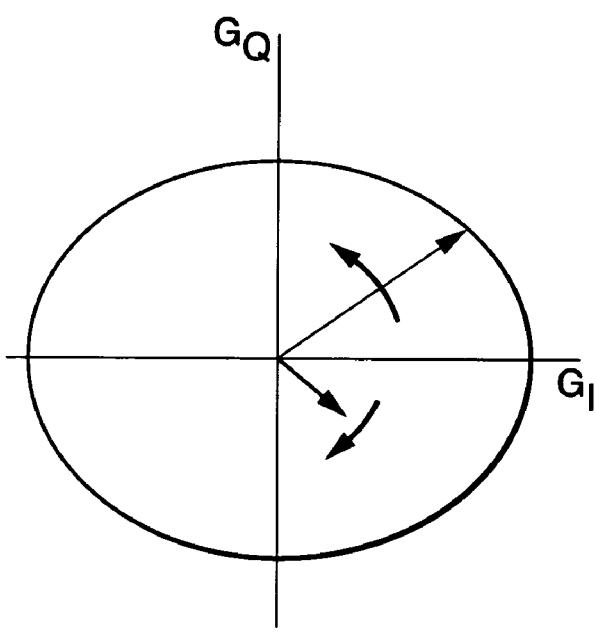

FIG. 6 presents a graphical representation of this ghost generation due to gain imbalance. FIG. 6a shows a system with I-Q gain balance, such that a phasor experiences the same amplification independent of its instantaneous phase. FIG. 6b shows a system with gain imbalance between the I and Q channels. The gain is now an ellipse, rather than a circle. An input phasor rotating clockwise must be accompanied by another phasor rotating counterclockwise so that the two will add along the axis having higher gain and subtract along the axis with lower gain.

While the amplitude and phase characteristics for the calibration injection path are not critical, it is necessary to avoid phases which result in a net phase between the transmit and receive which is a multiple of 90°. This net phase includes the transmission phase of the injection path as well as differences in the LO phase.

Figure 7A:
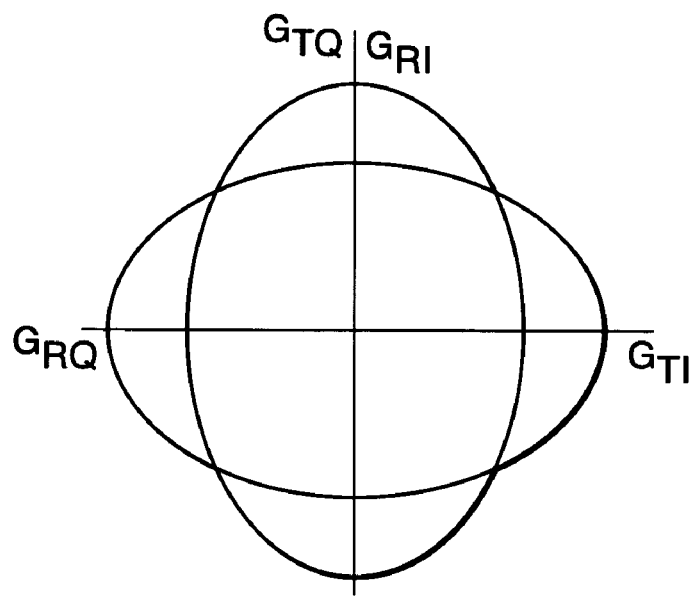

FIG. 7a shows the overlay of transmit and receive gain ellipses in the degenerate case of 90° net phase rotation as the calibration signal goes from baseband in the transmit chain to baseband in the receive chain. When the principle axes of the two ellipses align, there can be a net gain balance in I and Q in going from transmit baseband to receive baseband, while at the same time the transmit and receive chains each can have substantial I-Q gain imbalance. Thus, with degenerate axis alignment the calibration could not produce a feature which ensures the ability to calibrate the transmit and receive chains independently.

Figure 7B:
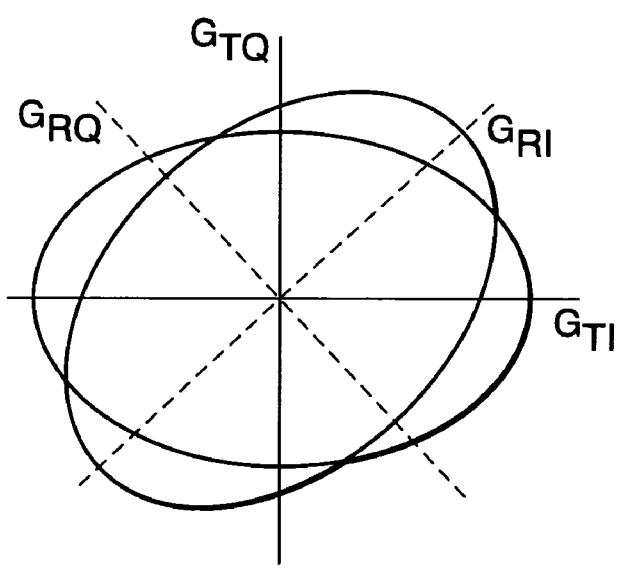
FIG. 7b shows the non-degenerate case when the principle axes are not aligned.

FIG. 7b shows the non-degenerate case when the principle axes are not aligned. In this case both the transmit- and receive-chain gains must be individually balanced in order to achieve a gain vs. phase which is a circle.

There are various ways to avoid degeneracy in the alignment of the transmit and receive gain axes. If parameter control is adequate, the circuit layout in forming the injection signal path could be designed to be approximately an odd multiple of 45°. Alternatively, a modest phase-control element could be included in the injection path, and capable of two difference phase shift values differing by approximately 45°.

Figure 8:
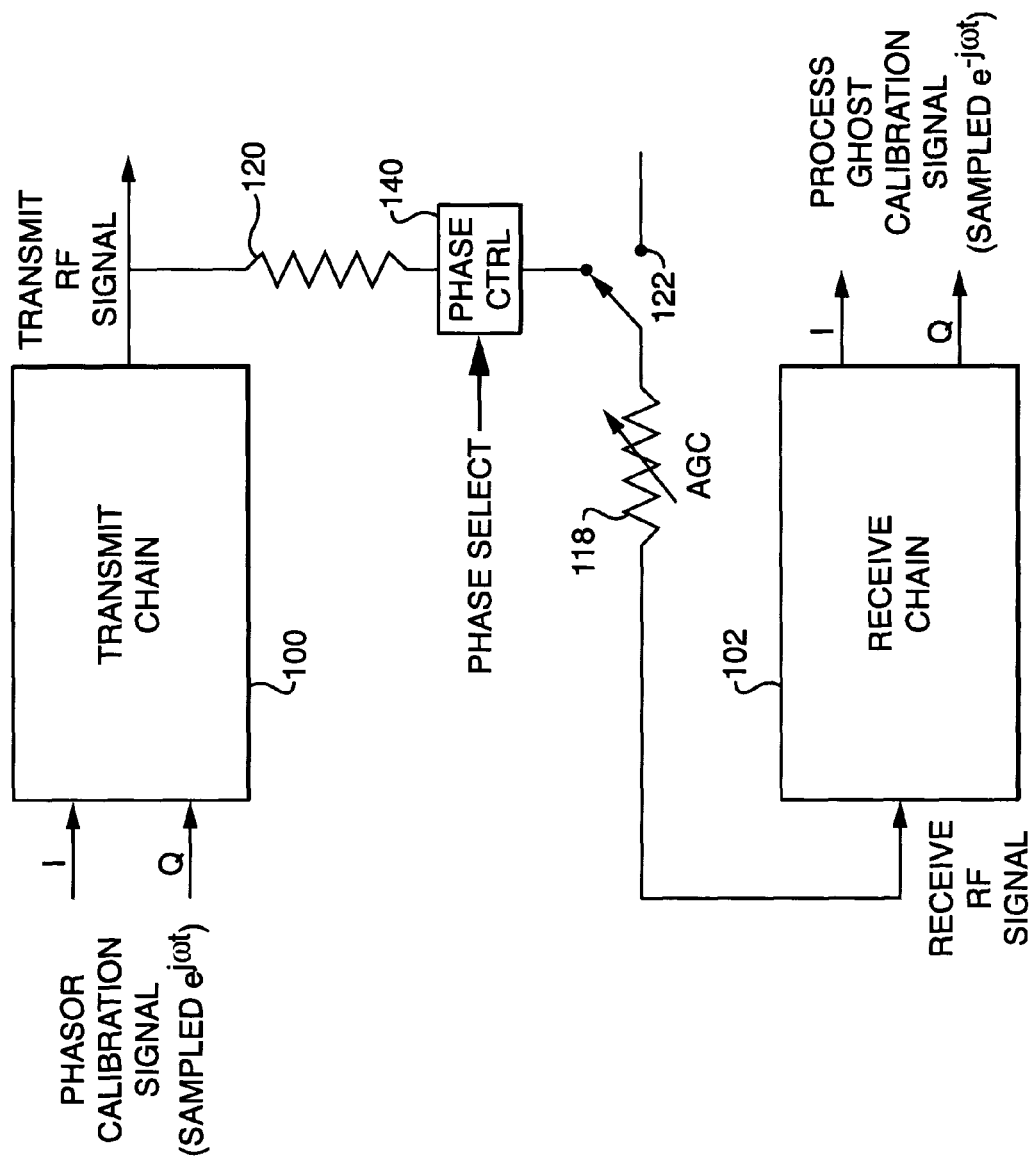
FIG. 8 depicts a preferred embodiment of the preferred embodiment of a system having calibration based upon a phasor calibration signal with phase selection to avoid degenerate alignment of the gain ellipses for transmit and receive.

FIG. 8 depicts a preferred embodiment where calibration based upon a phasor calibration signal with phase selection using phase control 140 is used to avoid degenerate alignment of the gain ellipses for transmit and receive. An initial calibration signal on one phase of the transmit baseband input should produce amplitudes in the receive baseband I and Q outputs which are of similar magnitude. If these magnitudes are too disparate, then existence of the nearly degenerate transmit/receiver phase alignment is indicated, and changing the phase by approximately ±45°, is sufficient to guarantee non-degenerate phase alignment. This pre-calibration to avoid degenerate phase alignment could be performed for each calibration operation, or perhaps infrequently if parameters otherwise remain stable.

Yet another approach would be to modulate the phase in the injection path so that the axes do not remain, on the average, in a degenerate alignment. It is important to recognize the greater simplicity in this case, having to avoid a narrow range of phase shifts, compared to the earlier case in which the phase had to fall within a narrow range.

The basic calibration operation comprises applying the test signal as the baseband transmit signal input, holding the receive gains fixed, and sequentially varying the difference in I- and/or Q-channel gains in the transmit chain. The observable, the magnitude squared of the ghost signal in the case that the test signal is a phasor, will vary in a parabolic manner with gain difference in the transmit channel. The transmit gain difference which most nearly minimizes the observable is selected and then remains fixed. The process is now repeated while varying only the receive differential gain. This will also produce observable variations which vary in a parabolic manner with gain difference in the receive chain. The differential receive gain which most nearly minimizes the observable is selected and then remains fixed. This alternate variation of differential gain in one chain while that of the other chain is held fixed enables the global minimization of the observable, at which point both the transmit and receive chain will have attained I-Q balance.

The varying of differential I-Q gains in the transmit and receive chains can be effected in many ways. It can be applied in a true differential manner, although this is not necessary and it is generally simpler to vary either the I or Q gain while holding the other fixed. In addition, the gains may be applied digitally to the digital representations of the transmit and/or receive baseband samples, or digital control of analog gain within the transmit and/or receive baseband gain chain. All of these alternatives can be used in accordance with the principles of the present invention.

For bandwidth-efficient modulations it is likely that the frequency response of the I and Q channels can be made to match over frequencies of interest, hence requiring only a single gain adjustment to bring the I and Q channels into adequate balance. If this is not the case, then a series of phasors could be used sequentially, with each such phasor providing a spot frequency calibration. Of course, such a technique would require some form of equalizer to set the compensating gains at the set of spot frequencies.

For the single-gain case, a particularly convenient frequency for the test phasor is one quarter of the modulation pulse rate, which is the effective sampling rate for the calibration signal, although it should be understood that the present invention is not limited to the one quarter relationship. This signal may be produced by the sequence {1,j,–

1,−j} repeated for the duration of the calibration signal. The original phasor is, of course, the correlation reference for its ghost signal since they are conjugates. In particular, taking samples of the baseband receive signal after steady state when any amplitude transients due to filtering have ceased, a sequence of four samples would appear as {1+γ,j−jγ,−1−γ,−j+jγ}, where y is the gain imbalance parameter. Multiplying this by the sequence {1,j,−1,−j} and summing results in 4γ. Thus, if the total number of samples taken N is a multiple of four, then in correlation the original phasor component of the receive baseband signal produces identically zero, while the ghost phasor correlates perfectly to produce Nγ. The coefficients used in correlation do not require any actual multiplies; rather, only additions and subtractions are used. Thus, this test signal may be processed in rather simple digital circuits.

The calibration process can be performed during the power-on cycle to attain initial operation, with switch 122 of FIG. 4, 5 or 8 being connected as shown. In this case convergence of the process might require several basic cycles of calibration, each comprising a transmit and a receive variation of gain, if both are being calibrated. Subsequently, at a rate consistent with parameter drift, for example due to self-heating of the circuitry, the calibration process can be used to update the differential gain settings. In this tracking mode the changes are likely to be small on each calibration cycle, and a number of algorithms can be used for the update process. A variety of algorithms exist for maintaining the desired operating point. One algorithm, called "tau-dither tracking" when applied to track signal timing in spread-spectrum communication systems and well known in the art, seeks to locate a maximum or minimum magnitude of a complex value by varying a parameter and using the parabolic nature of the magnitude dependence upon that parameter. Any of the algorithmic variations are consistent with the calibration techniques of the present invention.

Thus, the transmit signal is injected into the receive chain of the transceiver in order to support calibration independently of the I-Q gain balance of the both transmit and receive chains in their entirety, as required for proper operation among multiple users. This provides comprehensive I-Q gain balance, and in addition can be effected with non-critical circuit layout for the injection signal path. Furthermore, the calibration signals originate at baseband in the transmit channel, and can be observed at baseband in the receive channel. Consequently, there is minimal impact on the circuit layout to implement this calibration technique.

While this invention has been particularly shown and described with references to preferred embodiments thereof, it will be understood by those skilled in the art that various changes in form and details may be made therein without departing from the spirit and scope of the invention as defined by the following claims.

What is claimed is:

1. A transceiver system for transmitting and receiving data using both I and Q channels, comprising:
   a transmit chain;
   a receive chain; and
   a calibration subsystem comprising a signal path for injecting a calibration RF signal, generated in response to and as a function of a signal generated through the transmit chain, into the receive chain of the transceiver in order to independently calibrate the I-Q gain balance of the both transmit and receive chains in their entirety; wherein the calibration RF signal includes a calibration cycle, and the calibration cycle determines transmitter I-Q gain settings which minimize an observable indicator while holding receive I-Q gain settings constant, and which in turn determines receiver I-Q gain settings which minimizes the observable indicator while holding the transmit I-Q gain settings constant.

2. A transceiver system according to claim 1, wherein the calibration signal originates at baseband in the transmit channel, and is observed at baseband in the receive channel.

3. A transceiver system according to claim 1, wherein the transceiver is a direct-conversion transceiver.

4. A transceiver system according to claim 1, wherein the transceiver is a heterodyne-conversion transceiver.

5. A transceiver system according to claim 1, further including a channel gain adjuster for varying the differential I-Q gain in the transmit and receive chains independently in response to the calibration signal being injected into the receiver chain.

6. A transceiver system according to claim 1, further including a channel gain adjuster for varying the differential I-Q gain in the imbalanced chain in response to the calibration signal being injected into the receiver chain.

7. A transceiver system comprising:
   A. a transmit chain including: a signal generator for generating a baseband transmit signal; baseband I-Q amplification subsystem for providing baseband amplification of the baseband transmit signal; a direct-conversion subsystem for converting the baseband transmit signal to an RF transmit signal, and an RF transmit signal port;
   B. a receive chain including: an RF receive port for receiving an RF receive signal; a direct-conversion subsystem for converting the RF receive signal to a baseband receive signal; a baseband I-Q amplification subsystem for providing amplification of the baseband receive signal;
   a processor for processing of the baseband receive signal as required for the normal function of the transceiver, and
   C. a calibration subsystem including: a calibration RF signal generator for generating a calibration RF signal as a baseband transmit signal; a signal path for injecting the calibration RF signal from the RF transmit signal port to the RF receive signal port; a processor for processing the baseband receive calibration RF signal to form an observable indicator of I-Q imbalance; and a channel gain adjuster for varying the differential I-Q gain in the transmit and receive chains independently
   wherein the calibration RF signal includes a calibration cycle, and the calibration cycle determines transmitter I-Q gain settings which minimize an observable indicator while holding receive I-Q gain settings constant, and which in turn determines receiver I-Q gain settings which minimizes the observable indicator while holding the transmit I-Q gain settings constant.

8. A transceiver system according to claim 7, further including means for preventing the signal path for injecting the calibration RF signal from permanently imparting an unfavorable net phase shift from baseband transmit to baseband receive.

9. A transceiver system according to claim 8, wherein the means for preventing the signal path for injecting the calibration RF signal from permanently imparting an unfavorable net phase shift from baseband transmit to baseband receive includes a phase-calibration cycling subsystem.

10. A transceiver system according to claim 8, wherein the means for preventing the signal path for injecting the calibration RF signal from permanently imparting an unfavorable net phase shift from baseband transmit to baseband receive includes a slowly time-varying phase modulation subsystem.

11. A transceiver system according to claim 7, wherein the calibration RF signal includes a sequence of pulses taking on purely real or imaginary values at any instant.

12. A transceiver system according to claim 7, wherein the calibration RF signal includes a sampled phasor.

13. A transceiver system according to claim 7, wherein the calibration RF signal includes a discrete phasor.

14. A transceiver system according to claim 7, wherein the calibration RF signal includes a discrete phasor comprising $j^n$ or $j^{-n}$.

15. A transceiver system according to claim 7, wherein the calibration RF signal includes successive calibration cycles, and successive calibration cycles are used to refine or maintain I-Q balance.

16. A transceiver system comprising:
A. a transmit chain including: a signal generator for generating a baseband transmit signal; baseband I-Q amplification subsystem for providing baseband amplification of the baseband transmit signal; direct-conversion subsystem for converting the baseband transmit signal to an RF transmit signal, and including an RF transmit signal port;
B. a receive chain including: an RF receive port for receiving an RF receive signal; direct-conversion subsystem for converting the RF receive signal to a baseband receive signal; baseband I-Q amplification subsystem for providing amplification of the baseband receive signal;
processing of the baseband receive signal as required for the normal function of the transceiver, and
C. a calibration subsystem including; a calibration RF signal generator for generating a calibration RF signal as a baseband transmit signal; a signal path for injecting the calibration RF signal from the RF transmit signal port to the RF receive signal port; a processor for processing the baseband receive calibration RF signal to form an observable indicator of I-Q imbalance; and,
D. a channel gain adjuster for varying the differential I-Q gain in the imbalanced chain,
wherein the calibration RF signal includes a calibration cycle, and the calibration cycle determines transmitter I-Q gain settings which minimize an observable indicator while holding receive I-Q gain settings constant, and which in turn determines receiver I-Q gain settings which minimizes the observable indicator while holding the transmit I-Q gain settings constant.

17. A transceiver system according to claim 16, wherein the calibration RF signal includes a sequence of pulses taking on purely real or imaginary values at any instant.

18. A transceiver system according to claim 16, wherein the calibration RF signal includes a sampled phasor.

19. A transceiver system according to claim 16, wherein the calibration RF signal includes a discrete phasor.

20. A transceiver system according to claim 16, wherein the calibration RF signal includes a discrete phasor comprising $j^n$ or $j^{-n}$.

21. A transceiver system according to claim 16, wherein successive calibration cycles are used to refine or maintain I-Q balance.

22. A transceiver system comprising:
A. a transmit chain including: a signal generator for generating a baseband transmit signal; a baseband I-Q amplification subsystem for providing baseband amplification of the baseband transmit signal; at least one stage of frequency conversion of the baseband transmit signal to an intermediate frequency; conversion subsystem for converting the baseband transmit signal at the intermediate frequency to an RF transmit signal, and including an RF transmit signal port;
B. a receive chain including: an RF receiving port for receiving an RF receive signal; at least one stage of frequency conversion of the receive signal to an intermediate frequency; a conversion subsystem for converting the RF receive signal to a baseband receive signal; baseband I-Q amplification subsystem for providing amplification of the baseband receive signal;
processing of the baseband receive signal as required for the normal function of the transceiver, and
C. a calibration subsystem including: a calibration RF signal generator for generating a calibration RF signal as a baseband transmit signal; a signal path for injecting the calibration RF signal from the RF transmit signal port to the RF receive signal port; a processor for processing the baseband receive calibration RF signal to form an observable indicator of I-Q imbalance; and,
channel gain adjuster for varying the differential I-Q gain in the transmit and receive chains independently
wherein the calibration RF signal includes a calibration cycle, and the calibration cycle determines the transmitter I-Q gain settings which minimize the observable indicator while holding the receive I-Q gain settings constant, and which in turn determines the receiver I-Q gain settings which minimizes the observable indicator while holding the transmit I-Q gain settings constant.

23. A transceiver system according to claim 22, further including means for preventing the signal path for injecting the calibration RF signal from permanently imparting an unfavorable net phase shift from baseband transmit to baseband receive.

24. A transceiver system according to claim 23, wherein the means for preventing the signal path for injecting the calibration RF signal from permanently imparting an unfavorable net phase shift from baseband transmit to baseband receive includes a phase-calibration cycling subsystem.

25. A transceiver system according to claim 23, wherein the means for preventing the signal path for injecting the calibration RF signal from permanently imparting an unfavorable net phase shift from baseband transmit to baseband receive includes a slowly time-varying phase modulation subsystem.

26. A transceiver system according to claim 22, wherein the calibration RF signal includes a sequence of pulses taking on purely real or imaginary values at any instant.

27. A transceiver system according to claim 22, wherein the calibration RF signal includes a sampled phasor.

28. A transceiver system according to claim 22, wherein the calibration RF signal includes a discrete phasor.

29. A transceiver system according to claim 22, wherein the calibration RF signal includes a discrete phasor comprising $j^n$ or $j^{-n}$.

30. A transceiver system according to claim 22, wherein the calibration RF signal includes successive calibration cycles, and successive calibration cycles are used to refine or maintain I-Q balance.

31. A transceiver system according to claim 22, wherein the at least one stage of frequency conversion includes amplification means for amplifying the transmit signal at the intermediate frequency.

32. A transceiver system comprising:
A. a transmit chain including: a signal generator for generating a baseband transmit signal; a baseband I-Q amplification subsystem for providing baseband amplification of the baseband transmit signal; at least one stage of frequency conversion of the baseband transmit signal to an intermediate frequency; a conversion subsystem for converting the baseband transmit signal at the intermediate frequency to an RF transmit signal, and including an RF transmit signal port;

B. a receive chain including: an RF receiving port for receiving an RF receive signal; at least one stage of frequency conversion of the receive signal to an intermediate frequency; a conversion subsystem for converting the RF receive signal to a baseband receive signal; baseband I-Q amplification subsystem for providing amplification of the baseband receive signal; processing of the baseband receive signal as required for the normal function of the transceiver, and C. a calibration subsystem including: a calibration RF signal generator for generating a calibration RF signal as a baseband transmit signal; a signal path for injecting the calibration RF signal from the RF transmit signal port to the RF receive signal port; a processor for processing the baseband receive calibration RF signal to form an observable indicator of I-Q imbalance; and, D. a channel gain adjuster for varying the differential I-Q gain in the imbalanced chain wherein the calibration RF signal includes a calibration cycle, and the calibration cycle determines transmitter I-Q gain settings which minimize an observable indicator while holding receive I-Q gain settings constant, and which in turn determines receiver I-Q gain settings which minimizes the observable indicator while holding the transmit I-Q gain settings constant.

33. A transceiver system according to claim 32, wherein the calibration RF signal includes a sequence of pulses taking on purely real or imaginary values at any instant.

34. A transceiver system according to claim 32, wherein the calibration RF signal includes a sampled phasor.

35. A transceiver system according to claim 32, wherein the calibration RF signal includes a discrete phasor.

36. A transceiver system according to claim 32, wherein the calibration RF signal includes a discrete phasor comprising $j^n$ or $j^{-n}$.

37. A transceiver system according to claim 32, wherein successive calibration cycles are used to refine or maintain I-Q balance.

38. A method of calibrating a transceiver system for transmitting and receiving data using both I and Q channels and including a transmit chain and a receive chain; the method comprising;

injecting a calibration RF signal, generated in response to and as a function of a signal generated through the transmit chain, into the receive chain of the transceiver in order to independently calibrate the I-Q gain balance of the both transmit and receive chains in their entirety;

wherein the calibration RF signal includes a calibration cycle, and further including using the calibration cycle so as to determine transmitter I-Q gain settings so as to minimize an observable indicator while holding receive I-Q gain settings constant, and determining receiver I-Q gain settings so as to minimize the observable indicator while holding transmit I-Q gain settings constant.

39. A method according to claim 38, wherein the calibration RF signal originates at baseband in the transmit channel, and is observed at baseband in the receive channel.

40. A method according to claim 38, wherein the transceiver is a direct-conversion transceiver.

41. A method according to claim 38, wherein the transceiver is a heterodyne-conversion transceiver.

42. A method according to claim 38, further including adjusting the channel gain so as to vary the differential I-Q gain in the transmit and receive chains independently in response to the calibration RF signal being injected into the receiver chain.

43. A method according to claim 38, further including adjusting the channel gain so as to vary the differential I-Q gain in the imbalanced chain in response to the calibration RF signal being injected into the receiver chain.

44. A method of calibrating a transceiver system for transmitting and receiving data using both I and Q channels and comprising (a) a transmit chain including a signal generator for generating a baseband transmit signal; baseband I-Q amplification subsystem for providing baseband amplification of the baseband transmit signal; direct-conversion subsystem for convening the baseband transmit signal to an RF transmit signal, and including an RF transmit signal port; and (b) a receive chain including an RF receive port for receiving an RF receive signal; direct-conversion subsystem for converting the RF receive signal to a baseband receive signal; baseband I-Q amplification subsystem for providing amplification of the baseband receive signal; a processor for processing of the baseband receive signal as required for the normal function of the transceiver, the method comprising:

generating a calibration RF signal as a baseband transmit signal; and injecting the calibration RF signal from the RF transmit signal port to the RF receive signal port;

processing the baseband receive calibration RF signal to form an observable indicator of I-Q imbalance; and varying the differential I-Q gain in the transmit and receive chains independently wherein the calibration RF signal includes a calibration cycle, and further including using the calibration cycle so as to determine the transmitter I-Q gain settings so as to minimize the observable indicator while holding the receive I-Q gain settings constant, and determining the receiver I-Q gain settings so as to minimize the observable indicator while holding the transmit I-Q gain settings constant.

45. A method according to claim 44, further including preventing the injection of the calibration RF signal from permanently imparting an unfavorable net phase shift from baseband transmit to baseband receive.

46. A method according to claim 45, wherein preventing the injection of the calibration RF signal from permanently imparting an unfavorable net phase shift from baseband transmit to baseband receive includes phase-calibration cycling.

47. A method according to claim 45, wherein preventing the injection of the calibration RF signal from permanently imparting an unfavorable net phase shift from baseband transmit to baseband receive includes slowly time-varying phase modulating.

48. A method according to claim 44, wherein generating the calibration RF signal includes generating a sequence of pulses taking on purely real or imaginary values at any instant.

49. A method according to claim 44, wherein the calibration RF signal includes a sampled phasor.

50. A method according to claim 44, wherein the calibration RF signal includes a discrete phasor.

51. A method according to claim 44, wherein the calibration RF signal includes a discrete phasor comprising $j^n$ or $j^{-n}$.

52. A method according to claim 44, wherein the calibration RF signal includes successive calibration cycles, and further including using the successive calibration cycles to refine or maintain I-Q balance.

53. A method of calibrating a transceiver system comprising (a) a transmit chain including a signal generator for generating a baseband transmit signal; baseband I-Q amplification subsystem for providing baseband amplification of the baseband transmit signal; a direct-conversion subsystem for converting the baseband transmit signal to an RF transmit signal, and an RF transmit signal port; and (b) a receive chain including an RF receive port for receiving an RF receive signal; a direct-conversion subsystem for converting the RF receive signal to a baseband receive signal; baseband I-Q amplification subsystem for providing amplification of the baseband receive signal; processing of the baseband receive signal as required for the normal function of the transceiver, the method comprising
    generating a calibration RF signal as a baseband transmit signal;
    injecting the calibration RF signal from the RF transmit signal port to the RF receive signal port;
    processing the baseband receive calibration RF signal to form an observable indicator of I-Q imbalance; and
    varying the differential I-Q gain in the imbalanced chain so as to adjust the gain;
    wherein the calibration RF signal includes a calibration cycle, and further including using the calibration cycle so as to determine transmitter I-Q gain settings so as to minimize an observable indicator while holding receive I-Q gain settings constant, and determining receiver I-Q gain settings so as to minimize the observable indicator while holding transmit I-Q gain settings constant.

54. A method according to claim 53, wherein generating the calibration RF signal includes generating a sequence of pulses taking on purely real or imaginary values at any instant.

55. A method according to claim 53, wherein the calibration RF signal includes a sampled phasor.

56. A method according to claim 53, wherein the calibration RF signal includes a discrete phasor.

57. A method according to claim 53, wherein the calibration RF signal includes a discrete phasor comprising $j^n$ or $j^{-n}$.

58. A method according to claim 53, further including using successive calibration cycles to refine or maintain I-Q balance.

59. A method of calibrating a transceiver system comprising (a) a transmit chain including a signal generator for generating a baseband transmit signal; a baseband I-Q amplification subsystem for providing baseband amplification of the baseband transmit signal; at least one stage of frequency conversion of the baseband transmit signal to an intermediate frequency; a conversion subsystem for converting the baseband transmit signal at the intermediate frequency to an RF transmit signal, and an RF transmit signal port; and (b) a receive chain including an RF receiving port for receiving an RF receive signal; at least one stage of frequency conversion of the receive signal to an intermediate frequency; a conversion subsystem for converting the RF receive signal to a baseband receive signal; baseband I-Q amplification subsystem for providing amplification of the baseband receive signal; a processor for processing the baseband receive signal as required for the normal function of the transceiver, the method comprising
    generating a calibration RF signal as a baseband transmit signal;
    injecting the calibration RF signal from the RF transmit signal port to the RF receive signal port;
    processing the baseband receive calibration RF signal to form an observable indicator of I-Q imbalance; and
    varying the differential I-Q gain in the transmit and receive chains independently so as to adjust the differential I-Q gain so as to minimize any difference
    wherein the calibration RF signal includes a calibration cycle, wherein the method further includes using the calibration cycle to determine the transmitter I-Q gain settings which minimize the observable indicator while holding the receive I-Q gain settings constant, and determining the receiver I-Q gain settings which minimizes the observable indicator while holding the transmit I-Q gain settings constant.

60. A method according to claim 59, further including preventing the injection of the calibration RF signal from permanently imparting an unfavorable net phase shift from baseband transmit to baseband receive.

61. A method according to claim 60, wherein preventing the injection of the calibration RF signal from permanently imparting an unfavorable net phase shift from baseband transmit to baseband receive includes a phase-calibration cycling.

62. A method according to claim 60, wherein preventing the injection of the calibration RF signal from permanently imparting an unfavorable net phase shift from baseband transmit to baseband receive includes slowly time-varying phase modulation.

63. A method according to claim 59, wherein the calibration RF signal includes a sequence of pulses taking on purely real or imaginary values at any instant.

64. A method according to claim 59, wherein the calibration RF signal includes a sampled phasor.

65. A method according to claim 59, wherein the calibration RF signal includes a discrete phasor.

66. A method according to claim 59, wherein the calibration RF signal includes a discrete phasor comprising $j^n$ or $j^{-n}$.

67. A method according to claim 59, wherein the calibration RF signal includes successive calibration cycles, and the method further includes using successive calibration cycles to refine or maintain I-Q balance.

68. A method according to claim 59, wherein the at least one stage of frequency conversion includes amplification means for amplifying the transmit signal at the intermediate frequency.

69. A method of calibrating a transceiver system comprising: (a) a transmit chain including: a signal generator for generating a baseband transmit signal; a baseband I-Q amplification subsystem for providing baseband amplification of the baseband transmit signal; at least one stage of frequency conversion of the baseband transmit signal to an intermediate frequency; a conversion subsystem for converting the baseband transmit signal at the intermediate frequency to an RF transmit signal, and an RF transmit signal port; and (b) a receive chain including an RF receiving port for receiving an RF receive signal; at least one stage of frequency conversion of the receive signal to an intermediate frequency; a conversion subsystem for converting the RF receive signal to a baseband receive signal; baseband I-Q amplification subsystem for providing amplification of the baseband receive signal; and a processor for processing of the baseband receive signal as required for the normal function of the transceiver, the method comprising:
  generating a calibration RF signal as a baseband transmit signal;
  injecting the calibration RF signal from the RF transmit signal port to the RF receive signal port;
  processing the baseband receive calibration RF signal to form an observable indicator of I-Q imbalance; and,
  varying the differential I-Q gain in the imbalanced chain so as to balance the I-Q gain;
  wherein the calibration RF signal includes a calibration cycle, and further including using the calibration cycle so as to determine transmitter I-Q gain settings so as to minimize an observable indicator while holding receive I-Q gain settings constant, and determining receiver I-Q gain settings so as to minimize the observable indicator while holding transmit I-Q gain settings constant.

70. A method according to claim 69, wherein the calibration RF signal includes a sequence of pulses taking on purely real or imaginary values at any instant.

71. A method according to claim 69, wherein the calibration RF signal includes a sampled phasor.

72. A method according to claim 69, wherein the calibration RF signal includes a discrete phasor.

73. A method according to claim 69, wherein the calibration RF signal includes a discrete phasor comprising $j^n$ or $j^{-n}$.

74. A method according to claim 69, further including using successive calibration cycles to refine or maintain I-Q balance.

* * * * *